United States Patent
Yoshimura et al.

(10) Patent No.: US 6,322,930 B1
(45) Date of Patent: Nov. 27, 2001

(54) NON-AQUEOUS ELECTROLYTE BATTERY

(75) Inventors: Seiji Yoshimura; Toshiyuki Nohma; Koji Nishio, all of Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/404,374

(22) Filed: Sep. 24, 1999

(30) Foreign Application Priority Data

Sep. 25, 1998 (JP) .................................................. 10-270669

(51) Int. Cl.⁷ ...................................................... H01M 10/40
(52) U.S. Cl. ........................... 429/341; 429/344; 429/326
(58) Field of Search ..................... 429/341, 326, 429/344

(56) References Cited

U.S. PATENT DOCUMENTS 5,849,432 * 12/1998 Angell et al. .

FOREIGN PATENT DOCUMENTS 06-338321 A   12/1994  (JP) .
11-054133 A   2/1999  (JP) .

OTHER PUBLICATIONS

Michel W. Barsoum et al, "In situ determination of the kinetics of reaction between lithium and fast ion conducting lithium borate glasses", *Solid State Ionics*, 18 & 19 pp. 388–392, 1986. (No Month).

J. Bartel et al., "A New Class of Electrochemically and Thermally Stable Lithium Salts for Lithium Battery Electrolytes", *J. Electrochem. Soc.*, vol. 142, pp. 2527–2531, 1995, Aug.

D. A. Hensley et al., "Scanning Force Microscopy Investigation of Surface Forces at the Tungsten Oxide/Lithium Borate Interface", *J. Electrochem. Soc.*, vol. 145, No. 2, pp. 669–675, 1998, Feb.

* cited by examiner

*Primary Examiner*—John S. Maples
(74) *Attorney, Agent, or Firm*—Kubovcik & Kubocvik

(57) ABSTRACT

A non-aqueous electrolyte battery includes a positive electrode, a negative electrode and a non-aqueous electrolyte, wherein the non-aqueous electrolyte contains boric acid ester as a solvent.

9 Claims, 1 Drawing Sheet

NON-AQUEOUS ELECTROLYTE BATTERY

FIELD OF THE INVENTION

The present invention relates to a non-aqueous electrolyte battery having a positive electrode, a negative electrode and an non-aqueous electrolyte. Specifically, the present invention relates to an improvement in the cycle characteristics of a non-aqueous electrolyte battery.

BACKGROUND OF THE INVENTION

High electromotive force non-aqueous electrolyte batteries which utilize oxidation and reduction of lithium have lately attracted attention as high capacity and high energy density batteries.

As the non-aqueous electrolyte for these types of batteries, there are generally used electrolytes in which a solute, for example, lithium hexafluorophosphate ($LiPF_6$), lithium perchlorate ($LiClO_4$), and the like, is dissolved in a solvent, for example, propylene carbonate, dimethyl carbonate and the like.

It has been proposed that acetyl propylene carbonate having an acetyl substituent group at the 3- or 4-position be used as a solvent of a non-aqueous electrolyte to increase current efficiency during charge-discharge cycles of the negative electrode (Japanese patent Laid-Open publication No. Sho 63-32870).

However, the non-aqueous electrolyte reacts with the negative electrode, etc. in the non-aqueous electrolyte battery described above. There are still problems that cycle characteristics are reduced.

OBJECT OF THE INVENTION

An object of the present invention is to solve the problems explained above. That is, the present invention prevents a non-aqueous electrolyte from reacting with a negative electrode, etc. and provides a non-aqueous electrolyte battery having excellent cycle characteristics.

SUMMARY OF THE INVENTION

The present invention provides a non-aqueous electrolyte battery having a positive electrode, a negative electrode and a non-aqueous electrolyte, wherein the non-aqueous electrolyte contains boric acid ester as a solvent.

Figure 1:
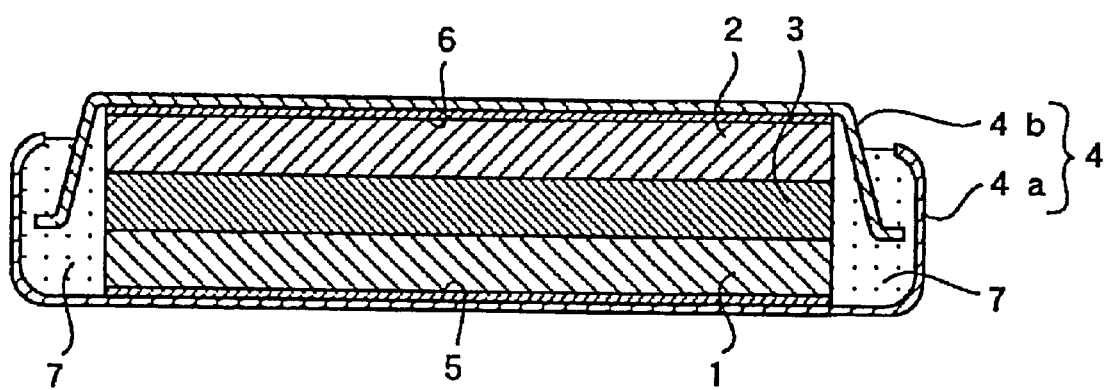
FIG. 1 is a cross section of a lithium secondary battery of the present invention.

1 a positive electrode
2 a negative electrode
3 a separator
4 a battery case
4a a positive can
4b a negative can
5 a positive electrode collector
6 a negative electrode collector
7 an insulating packing

DETAILED DESCRIPTION OF PREFERRED EMBODIMENTS

As the boric acid ester useful in the present invention, triethyl borate, tri-n-propyl borate and trimethyl borate can be illustrated. Triethyl borate and tri-n-propyl borate are particularly preferable with respect to improving the cyclic characteristics of a non-aqueous electrolyte battery.

As the solvent of the non-aqueous electrolyte, boric acid ester alone or as a mixture with other solvents can be used.

As a solvent to be mixed with a boric acid ester, a cyclic carbonate, for example, ethylene carbonate, propylene carbonate, vinylene carbonate, butylene carbonate and the like, a chain (noncyclic) carbonate, for example, dimethyl carbonate, diethyl carbonate, methyl ethyl carbonate, and 1,2-dimethoxyethane, 1,2-diethoxyethane, ethoxymethoxyethane and the like are illustrated.

When a mixture of a boric acid ester and a chain (noncyclic) carbonic acid ester at a ratio of 10~95:90~5 by volume is used, the cyclic characteristics of the non-aqueous electrolyte battery can be significantly improved. A ratio of the boric acid ester to the chain (noncyclic) carbonic acid ester of 30~70:70~30 by volume is more preferable for further improving the cyclic characteristics.

As a solute dissolved in the solvent there can be mentioned lithium compounds, for example, $LiPF_6$, $LiBF_4$, $LiAsF_6$, $LiSbF_6$, $LiBiF_4$, $LiAlF_4$, $LiGaF_4$, $LiInF_4$, $LiN(CF_3SO_2)_2$, $LiCF_3SO_3$, $LiN(C_2F_5SO_2)_2$, $LiC(CF_3SO_2)_3$, $LiClO_4$ and the like. A lithium compound containing fluorine, for example, $LiPF_6$, $LiBF_4$, $LiAsF_6$ and the like is particularly effective for improving the cyclic characteristics of the non-aqueous electrolyte battery.

As the positive electrode for this battery, there can be used manganese dioxide, manganese oxide containing lithium, cobalt oxide containing lithium, vanadium oxide containing lithium, nickel oxide containing lithium, iron oxide containing lithium, chromium oxide containing lithium, titanium oxide containing lithium and the like.

As a negative electrode material, metallic lithium, lithium alloy, for example, Li—Al, Li—In, Li—Sn, Li—Pb, Li—Bi, Li—Ga, Li—Sr, Li—Si, Li—Zn, Li—Cd, Li—Ca, Li—Ba, and the like, carbon materials capable of occluding and discharging lithium, for example, graphite, coke, calcined organic materials, and the like, metal oxides, for example, $SnO_2$, $SnO$, $TiO_2$, $Nb_2O_3$ and the like, which have a potential lower than a positive electrode material, can be used in the present invention. Lithium metal is most preferable as the negative electrode material of the present invention.

EXAMPLE

The present invention is described below in detail in conjunction with certain examples. However, it is of course understood that the present invention is not limited to the following examples. The present invention can be modified within the scope and spirit of the appended claims.

Examples 1 to 3 and Comparative Examples 1 to 4

[Preparation of Positive Electrode]

Powder $LiCoO_2$, a positive electrode material, graphite as an electrically conducting agent and polytetrafluoroethylene as a binder were mixed at a ratio of 90:6:4 by weight to prepare a positive electrode mixture. The positive electrode mixture was coated on a positive electrode collector made of aluminum. The coated positive electrode collector was press formed, and was heated at 150° C. for two hours under vacuum to prepare a positive electrode disk having a diameter of 16 mm and a thickness of 1.0 mm.

[Preparation of Negative Electrode]

A rolled lithium metal was cut into a disk having a diameter of 16 mm and a thickness of 1.0 mm.

[Preparation of Non-aqueous electrolyte]

$LiPF_6$ was dissolved in a solvent as shown in Table 1 to a concentration of 1 mol/l to prepare the nonaqueous electrolyte. That is, trimethyl borate in Example 1, triethyl borate in Example 2, tri-n-propyl borate in Example 3, propylene carbonate in Comparative Example 1, 4-acetyl propylene carbonate in Comparative Example 2, ethylene carbonate in Comparative Example 3 and tetrahydrofuran in Comparative Example 4 were used as a solvent.

[Preparation of Secondary Battery]

Coin-shaped batteries as shown in FIG. 1 were prepared from the above positive electrode, negative electrode and the non-aqueous electrolyte. A positive electrode (1) was press bonded to the inside surface of a positive electrode collector (5). A negative electrode collector (6) made of ferrite stainless steel (SUS) was secured to the bottom of a negative can (4b). The edge of the negative can (4b) was secured in insulating packing (7) made of polypropylene. The outer edge of insulating packing (7) was covered by a positive can (4a). The positive electrode collector (5) was secured to the bottom of the positive can (4a). The positive electrode (1) was secured to the inside of the positive electrode collector (5). A separator (3) impregnated with a nonaqueous electrolyte was located between the positive electrode (1) and the negative electrode (2). The batteries had a diameter of 20 mm and a thickness of 2.5 mm.

[Cycle Characteristics]

Each battery was repeatedly subjected to charging to 4.2 V at 1 mA, then to discharging to 3.0 V at 1 mA until its discharge capacity was reduced to not greater than 25 mAh which is half of the original discharge capacity, i.e., 50 mAh, of the battery.

The results are shown in Table 1.

TABLE 1

Neqative electrode material: Metallic lithium
Solute: $LiPF_6$

| | Solvent for nonaqueous electrolyte | Number of cycles |
| --- | --- | --- |
| Example 1 | Trimethyl borate | 35 |
| Example 2 | Triethyl borate | 43 |
| Example 3 | Tri-n-propyl borate | 45 |
| Comparative Example 1 | Propylene carbonate | 18 |
| Comparative Example 2 | 4-Acetyl propylene carbonate | 20 |
| Comparative Example 3 | Ethylene carbonate | 19 |
| Comparative Example 4 | Tetrahydrofuran | 15 |

Batteries of the present invention require more cycles to reach 50% of the original discharge capacity than batteries of the Comparative Examples which used a solvent other than a boric acid ester. Batteries of the present invention have improved cycle characteristics. Batteries in Examples 2 and 3 in which triethyl borate and tri-n-propyl borate, respectively, were used as a solvent of non-aqueous electrolyte had specifically excellent improved cycle capacity.

Examples 4 to 9

Batteries of the present invention were prepared in the same manner as Example 3 except that $LiBF_4$ in Example 4, $LiAsF_6$ in Example 5, $LiCF_3SO_3$ in Example 6, $LiN(CF_3SO_2)_2$ in Example 7, $LiC(CF_3SO_2)_3$ in Example 8 and $LiClO_4$ in Example 9 were used as a solute in the non-aqueous electrolyte.

Cycle characteristics of the batteries of Examples 4 to 9 were tested as described above.

The results are shown in Table 2 together with the results of Example 3.

TABLE 2

Negative electrode material: Metallic lithium
Solvent: Tri-n-propyl borate

| | Solute in nonaqueous electrolyte | Number of cycles |
| --- | --- | --- |
| Example 3 | $LiPF_6$ | 45 |
| Example 4 | $LiBF_4$ | 50 |
| Example 5 | $LiAsF_6$ | 51 |
| Example 6 | $LiCF_3SO_3$ | 48 |
| Example 7 | $LiN(CF_3SO_2)_2$ | 43 |
| Example 8 | $LiC(CF_3SO_2)_3$ | 42 |
| Example 9 | $LiClO_4$ | 37 |

Batteries of Examples 4 to 9 have improved cycle characteristics. Especially, batteries in which a solute including fluorine was used, i.e., Examples 4 to 8, have better cycle characteristics than the battery of Example 9 in which the solute, i.e., $LiClO_4$, does not include fluorine.

A positive electrode collector (5) and a positive can (4a) of the batteries of Examples 6, 7 and 8 are preferably coated by Ta alloy or Ta.

Examples 10 to 13

Batteries, Examples 10 to 13, were prepared in the same manner as Example 3 except that different negative electrodes were used as a negative electrode as shown in Table 3. That is, Li—Al alloy in Example 10, graphite in Example 11, $SnO_2$ in Example 12 and $TiO_2$ in Example 13 were used. Each negative electrode was prepared as described below.

Comparative Examples 5 to 8

Batteries, Comparative Examples 5 to 8, were prepared in the same manner as Comparative Example 1 except that different negative electrodes were used for a negative electrode as shown in Table 3. The negative electrodes used for Comparative Example 5, Comparative Example 6, Comparative Example 7 and Comparative Example 8 are the same as Examples 10, 11, 12 and 13, respectively. Each negative electrode was prepared as described below.

Examples 10 and Comparative Example 5

[Preparation of Negative Electrode]

A rolled sheet of lithium and aluminum at a ratio of 20:80 by weight was cut to a disk, and was alloyed to prepare a negative electrode having a diameter of 16 mm and a thickness of 1.0 mm.

Batteries of Example 10 and Comparative Example 5 were prepared in the same manner as Example 3 and Comparative Example 1, respectively, except that the negative electrode prepared above was used.

Example 11 and Comparative Example 6

[Preparation of Negative Electrode]

Graphite and polytetrafluoroethylene as a binding agent were mixed in a ratio of 95:5 by weight to prepare a negative electrode materials mixture. The negative electrode materials mixture was press formed, and was heated at 150° C. for two hours under vacuum to prepare a negative electrode having a diameter of 16 mm and a thickness of 1.0 mm.

Batteries of Example 11 and Comparative Example 6 were prepared in the same manner as Example 3 and Comparative Example 1, respectively, except that the negative electrode prepared above was used.

Example 12 and Comparative Example 7
[Preparation of Negative Electrode]

Stannic oxide ($SnO_2$), graphite as an electrical conducting agent and polytetrafluoroethylene as a binding agent were mixed in a ratio of 90:6:4 by weight to prepare a negative electrode materials mixture. The negative electrode materials mixture was press formed, and was heated at 150° C. for two hours under vacuum to prepare a negative electrode having a diameter of 16 mm and a thickness of 1.0 mm.

Batteries of Example 12 and Comparative Example 7 were prepared in the same manner as Example 3 and Comparative Example 1, respectively, except that the negative electrode prepared above was used.

Example 13 and Comparative Example 8
[Preparation of Negative Electrode]

Titanium dioxide ($TiO_2$), graphite as an electrical conducting agent and polytetrafluoroethylene as a binding agent were mixed in a ratio of 90:6:4 by weight to prepare a negative electrode materials mixture. The negative electrode materials mixture was press formed, and was heated at 150° C. for two hours under vacuum to prepare a negative electrode having a diameter of 16 mm and a thickness of 1.0 mm.

Batteries of Example 12 and Comparative Example 7 were prepared in the same manner as Example 3 and Comparative Example 1, respectively, except that a negative electrode as prepared above was used.

Cycle characteristics of the batteries of Examples 10 to 13 and Comparative Examples 5 to 8 were tested as described above.

The results are shown in Table 3 together with the results of Example 3 and Comparative Example 1.

TABLE 3

Solute: $LiPF_6$

| | Solvent for non-aqueous electrolyte | Negative Electrode Material | Number of Cycles |
|---|---|---|---|
| Example 3 | Tri-n-propyl borate | Lithium metal | 45 |
| Example 10 | Tri-n-propyl borate | Li—Al alloy | 50 |
| Example 11 | Tri-n-propyl borate | Graphite | 56 |
| Example 12 | Tri-n-propyl borate | $SnO_2$ | 55 |
| Example 13 | Tri-n-propyl borate | $TiO_2$ | 52 |
| Comparative Example 1 | Propylene carbonate | Lithium metal | 18 |
| Comparative Example 5 | Propylene carbonate | Li—Al alloy | 24 |
| Comparative Example 6 | Propylene carbonate | Graphite | 30 |
| Comparative Example 7 | Propylene carbonate | $SnO_2$ | 29 |
| Comparative Example 8 | Propylene carbonate | $TiO_2$ | 28 |

Batteries of the present invention in which tri-n-propyl borate was used for a solvent of the non-aqueous electrode, regardless of differences between negative electrode materials, have excellent cycle characteristics as compared to batteries of Comparative Examples 5 to 8.

The relative improvement of a battery of the present invention using lithium metal as a negative electrode material (Example 3) (from 18 cycles to 45 cycles) was better in cycle characteristics than that of batteries using other materials, i.e., Li—Al alloy (from 24 to 50), graphite (from 30 to 56), stannic oxide (from 29 to 55) and titanium dioxide (from 28 to 52) (Examples 10 to 13).

Examples 14 to 20

Batteries of the present invention were prepared in the same manner as Example 3 except that a mixture of tri-n-propyl borate and another solvent at a ratio of 1:1 by volume as a non-aqueous electrolyte was used as shown in Table 4. That is, as another solvent, sulfolane in Example 14, propylene carbonate in Example 15, ethylene carbonate in Example 16, tetrahydrofuran in Example 17, dimethyl carbonate in Example 18, diethyl carbonate in Example 19 and methyl ethyl carbonate in Example 20 were used.

Cycle characteristics of the batteries of Examples 14 to 20 were tested as described above.

The results are shown in Table 4.

TABLE 4

Negative electrode material: Lithium metal
Solute: $LiPF_6$

| | Mixed solvent with tri-n-propyl borate | Number of cycles |
|---|---|---|
| Example 14 | Sulfolan | 42 |
| Example 15 | Propylene carbonate | 44 |
| Example 16 | Ethylene carbonate | 45 |
| Example 17 | Tetrahydrofuran | 42 |
| Example 18 | Dimethyl carbonate | 52 |
| Example 19 | Diethyl carbonate | 55 |
| Example 20 | Methyl ethyl carbonate | 54 |

Batteries of Examples 14 to 20 in which a mixture with boric acid ester was used as a non-aqueous solvent also had improved cycle characteristics. When a chain carbonic acid ester, for example, dimethyl carbonate, diethyl carbonate, methyl ethyl carbonate, and the like was used, cycle characteristics of a lithium secondary battery were especially improved as compared to the use of a boric acid ester alone (Examples 1 to 3) and a mixture with another solvent (Examples 14 to 17).

Examples 21 to 26 and Comparative Example 9

Batteries of Examples 21 to 26 were prepared in the same manner as Example 19 except that the ratio of the mixture of tri-n-propyl borate and diethyl carbonate was 5:65, 10:90, 30:70, 70:30, 90:10 and 95:5, respectively.

A battery of Comparative Example 9 was prepared in the same manner except that diethyl carbonate was used as a solvent for a non-aqueous electrolyte.

Cycle characteristics of the batteries of Examples 21 to 26 and Comparative Example 9 were tested as described above.

The results are shown in Table 5 together with the results of Example 3.

TABLE 5

| | Ratio of mixture of non-aqueous electrolyte | | Number of cycles |
|---|---|---|---|
| | Tri-n-propyl borate | Diethyl carbonate | |
| Comparative Example 9 | 0 | 100 | 20 |
| Example 21 | 5 | 95 | 45 |
| Example 22 | 10 | 90 | 50 |
| Example 23 | 30 | 70 | 53 |
| Example 19 | 50 | 50 | 55 |
| Example 24 | 70 | 30 | 53 |
| Example 25 | 90 | 10 | 48 |
| Example 26 | 95 | 5 | 48 |
| Example 3 | 100 | 0 | 45 |

When the solvent for the non-aqueous electrolyte was a mixture of tri-n-propyl borate and diethyl carbonate at a ratio of 10~95:90~5 by volume, especially 30~70:70:30, batteries had improved cycle characteristics.

ADVANTAGES OF THE INVENTION

The present invention provides a non-aqueous electrolyte secondary battery having improved cycle characteristics. It is believed that a coating is formed on the surface of a negative electrode which is in contact with the non-aqueous electrolyte to penetrate ions, for example, lithium ion, and to inhibit reactions between the non-aqueous electrolyte and the negative electrode.

What is claimed is:

1. A non-aqueous electrolyte battery comprising a positive electrode, a negative electrode, and a non-aqueous electrolyte, wherein said non-aqueous electrolyte contains boric acid ester as a solvent, said boric acid ester being selected from the group consisting of triethyl borate and tri-n-propyl borate.

2. A non-aqueous electrolyte battery according to claim 1, wherein said solvent for said non-aqueous electrolyte is a mixture of said boric acid ester and a chain (noncyclic) carbonic acid ester at a ratio of 10~95:90~5 by volume.

3. A non-aqueous electrolyte battery according to claim 2, wherein said solvent for said non-aqueous electrolyte is a mixture of said boric acid ester and a chain (noncyclic) carbonic acid ester at a ratio of 30~70:70~30 by volume.

4. A non-aqueous electrolyte battery according to claim 1, wherein said non-aqueous electrolyte contains a solute comprising fluorine.

5. A non-aqueous electrolyte battery according to claim 2, wherein said non-aqueous electrolyte contains a solute comprising fluorine.

6. A non-aqueous electrolyte battery according to claim 3, wherein said non-aqueous electrolyte contains a solute comprising fluorine.

7. A non-aqueous electrolyte battery according to claim 1, wherein said negative electrode comprises lithium metal.

8. A non-aqueous electrolyte battery according to claim 2, wherein said negative electrode comprises lithium metal.

9. A non-aqueous electrolyte battery according to claim 3, wherein said negative electrode comprises lithium metal.

* * * * *